2,928,728

PHOSPHATE COMPOSITIONS

Lloyd E. Weeks, Union, Ohio, assignor to Monsanto Chemical Company, St. Louis, Mo., a corporation of Delaware No Drawing. Application July 23, 1956
Serial No. 599,337

2 Claims. (Cl. 71—43)

This invention relates to phosphate compositions, and especially to ammonium phosphate compositions or other neutralized phosphoric acid compositions having particular utility as fertilizers. More particularly, the invention relates to phosphate compositions utilizing wet process phosphoric acid in which the polyvalent metal and other impurities normally present in the wet process acid have been stabilized to minimize sedimentation or sludging of such impurities. The invention also relates to stabilized wet process phosphoric acid compositions which can be neutralized with ammonia or other alkaline materials with a minimum of sludge formation.

Commercially available phosphoric acids are often classified according to the type of process by which they are manufactured. Accordingly, phosphoric acids are characterized either as "furnace grade" acid (also often referred to as "thermal reduction process" acid) or as "wet process" acid. In the production of furnace grade acid, phosphate rock is reduced to form elemental phosphorus. The phosphorus is oxidized to phosphorus pentoxide which is reacted with water to form phosphoric acid. This process gives a phosphoric acid of relatively high purity. Wet process acid is prepared by acidulation of phosphate rock with an inorganic acid such as sulfuric acid. In the course of recovering the phosphate values from the rock, considerable amounts of impurities in the rock are also dissolved in the acid, thereby giving a product containing appreciable quantities of silica, as well as iron, aluminum, fluorine, lead and arsenic compounds. Additional impurities are introduced if impure inorganic acids (for example, alkylation acids or sludge acids from petroleum refining processes) are utilized. A representative analysis of a typical wet process phosphoric acid prepared from spent alkylation acid is as follows:

| Component: | Weight percent |
|---|---|
| $P_2O_5$ | 28.27 |
| $SO_3$ | 0.0167 |
| F | 0.0104 |
| $Fe_2O_3$ | 0.0068 |
| CaO | 0.0032 |
| MgO | 0.0023 |
| $SiO_2$ | 0.0017 |
| $Na_2O$ | 0.0011 |
| $Al_2O_3$ | 0.0004 |
| MnO | 0.0002 |
| Organic | 4.20 |

(C, 18.03%; H, 5.96%; S, 17.15%)

For the conventional use of phosphoric acid in solid fertilizers, impurities such as those listed above are relatively insignificant. In the past few years, however, there has been considerable emphasis placed upon the preparation and use of aqueous solutions of mixed inorganic water-soluble fertilizer materials. One of the simplest ways to prepare such a material is to neutralize phosphoric acid with a water-soluble alkaline component such as ammonia, ammonium hydroxide, potassium hydroxide, etc., or mixtures thereof with other materials such as ammonium nitrate potassium nitrate, sodium nitrate, potassium chloride, etc. Most of the aforementioned impurities, which are soluble in the acid, are relatively insoluble in alkaline solutions. Thus, in the ammoniation or similar neutralization of wet process phosphoric acid for liquid fertilizer solutions, there is a strong tendency to precipitate considerable amounts of sludge. This sludge causes trouble by settling and clogging up the equipment used for handling and applying such liquid fertilizer solutions.

It is an object of the present invention to circumvent the foregoing difficulties without having to resort to the expense and inconvenience of removing the impurities from the wet process acid.

It has now been found that the above-discussed sludge or sedimentation which results from the neutralization of wet process phosphoric acid can be minimized or even completely avoided by the use of small amounts of a polyoxyethylene thioether of the class

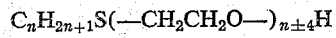

$$C_nH_{2n+1}S(-CH_2CH_2O-)_{n\pm 4}H$$

wherein $n$ is a number between 10 and 20, inclusive. These non-ionic surface-active agents were found to be unique among a large number of cationic, anionic and other non-ionic surface-active agents evaluated for the present purposes. They are readily prepared by the condensation of an alkyl mercaptan and ethylene oxide as described, for example, in U.S. 2,205,021 and U.S. 2,565,986.

The present surface-active agents contained alkyl groups having between 10 and 20, inclusive, carbon atoms; a preferred class of materials comprises those containing alkyl groups having between 10 and 14, inclusive, carbon atoms. The alkyl groups may be either straight chain radicals, e.g., n-decyl, n-dodecyl, n-tetradecyl, n-hexadecyl, etc., or branched chain radicals. Of particular interest among the branched-chain alkyl radicals are the radicals resulting from propylene or butylene polymerization or from the "oxo" alcohols prepared from such propylene or butylene polymers. Typical of these branched-chain alkyl groups are the branched-chain decyl radical of the "oxo" alcohol prepared from a propylene trimer, the dodecyl radical obtained from a propylene tetramer or a butylene trimer, the tridecyl radical of the "oxo" alcohol prepared from either of the foregoing dodecyl radicals, the pentadecyl radical obtained from a propylene pentamer, the hexadecyl radical obtained from a butylene tetramer, and the like.

In most cases, especially with the branched-chain alkyl compounds, the alkyl radicals will have been obtained from a mixture of various species of different chain lengths and configurations. In such a case the number $n$ refers to the molecularly weighted average of all of the alkyl groups in the particular mixture in question.

The polyoxyethylene portion of the molecule is similar to the alkyl portion of the molecule in that the present surface-active agents will generally be a mixture of different species having varying numbers of oxyethylene groups therein. Thus, the indicated number of oxyethylene groups in the molecule will usually be a molecularly weighted average number of oxyethylene groups in a mixture of varying chain-length materials. The optimum average number of oxyethylene groups to be utilized in the surface-active agents of this invention is dependent upon the length of the alkyl group in the mercaptan portion of the condensation product. In general, the average number of oxyethylene groups should be within about four of the average number of carbon atoms in the alkyl chain of the mercaptan group. A preferred class of materials comprise those in which the number of oxyethylene groups are within about two of the number of carbon atoms in the alkyl mercaptan portion of the molecule.

Particular examples of typical surface-active agents suitable for use according to the present invention are as follows: n-decyl mercaptan condensed with an average of 8.5 moles of ethylene oxide per mole of mercaptan; n-dodecyl mercaptan condensed with an average of 12 moles of ethylene oxide per mole of mercaptan; dodecyl (propylene tetramer) mercaptan condensed with an average of 10 moles of ethylene oxide per mole of mercaptan; tridecyl (from oxo alcohol of propylene tetramer) mercaptan condensed with an average of 11.5 moles of ethylene oxide per mole of mercaptan; tridecyl mercaptan (same as preceding) condensed with an average of 15 moles of ethylene oxide per mole of mercaptan; n-hexadecyl mercaptan condensed with an average of 20 moles of ethylene oxide per mole of mercaptan.

The amount of surface-active agents required to stabilize or inhibit sedimentation of insolubles will depend to some extent upon the concentration and the type of such insoluble materials. For most typical wet process acids, such as the one for which an analysis is presented above, suitable concentrations will run between about 0.001 weight percent and about 0.1 weight percent of the $P_2O_5$ in the wet acid. Preferred concentrations (on the same basis) will run between about 0.005 weight percent and about 0.05 weight percent.

In order to facilitate dispersion of the insoluble impurities, the particle size of such insoluble impurities should be maintained as small as feasible. The formation of small particles is promoted by carrying out the neutralization of the acid as rapidly as is practical and at an elevated temperature (e.g., 75° C. or higher), with subsequent rapid cooling of the neutralized product. It has further been found that stable dispersions of the impurities are promoted by having the surface-active agent present in the solution at the time the insoluble impurities are precipitated from solution. This is effected by dissolving the surface-active agent in the wet process acid prior to neutralization thereof. Consequently, a preferred embodiment of this invention comprises a solution of the present surface-active agents dissolved in a wet process phosphoric acid. Such an acid solution has the very practical advantage that the manufacturer of the acid can incorporate the surface-active agent into the acid, which can then be stored, transported and distributed to fertilizer formulators who have only to add ammonia or other alkaline materials to the acid without worrying about sludge formation resulting from precipitation of normally insoluble impurities.

The following example is presented as illustrative of various compositions claimed as my invention and as illustrative of the manner in which the surface-active agents described herein can be utilized to prepare liquid fertilizer solutions in which the usual sludge-forming insoluble impurities are stabilized in the form of non-settling dispersions.

*Example*

A typical wet process phosphoric acid prepared from spent alkylation sulfuric acid and having the same analysis set forth earlier in this specification was mixed with ½% by weight (based upon total solution of wet process acid) of the condensation product of 1 mole proportion of dodecyl mercaptan (from propylene tetramer) and 10 mole proportions of ethylene oxide. This solution was maintained at a temperature above 95° C. while sufficient gaseous ammonia was quickly reacted therewith to bring the pH of the reaction solution up to 6.6. The reaction mixture was quickly cooled to 35° C., after which 100 ml. thereof was immediately poured into a 5 centimeter diameter bottle and allowed to settle for 24 hours or more. The effectiveness of the dispersant was measured by the depth of sludge which settled to the bottom of the bottle. With the neutralized wet process phosphoric acid prepared as described in this example, there was only 1 mm. of sludge formed after 24 hours and no substantial increase in sediment after more than a week. In contrast thereto, a control sample prepared in the same way but without the addition of a surface-active agent had deposited 14 mm. of sludge after 24 hours.

I claim:

1. A method of producing an ammonium phosphate solution with minimized sludge forming characteristics from wet process phosphoric acid prepared from spent alkylation acid, which method comprises adding a minor proportion of a polyoxyethylene thioether of the class $$C_nH_{2n+1}S(-CH_2CH_2O-)_{n\pm 4}H$$

wherein $n$ is a number between 10 and 20, inclusive, to said wet process acid, neutralizing the said acid with ammonia at a temperature in excess of 75° C., and then rapidly cooling said neutralized product to a temperature below 35° C.

2. A method of producing an ammonium phosphate solution with minimized sludge forming characteristics from wet process phosphoric cid, which method comprises adding a minor proportion of a polyoxyethylene thioether of the class $$C_nH_{2n+1}S(-CH_2CH_2O-)_{n\pm 4}H$$

wherein $n$ is a number between 10 and 20, inclusive, to said wet process acid and thereafter neutralizing said acid with ammonia and rapidly cooling said neutralized product.

References Cited in the file of this patent

UNITED STATES PATENTS

| | | |
|---|---|---|
| 1,264,513 | Hechenbleikner | Apr. 30, 1918 |
| 1,876,011 | Larsson | Sept. 6, 1932 |
| 2,037,706 | Curtis | Apr. 21, 1936 |
| 2,525,178 | Miller | Oct. 10, 1950 |
| 2,629,696 | Dodd et al. | Feb. 24, 1953 |
| 2,677,700 | Jackson et al. | May 4, 1954 |
| 2,746,921 | Menaul | May 22, 1956 |